United States Patent
Fuller et al.

(10) Patent No.: US 7,527,886 B2
(45) Date of Patent: May 5, 2009

(54) START UP OF CASCADED FUEL CELL STACK

(75) Inventors: Thomas F. Fuller, Glastonbury, CT (US); Ryan J. Balliet, West Hartford, CT (US)

(73) Assignee: UTC Power Corporation, South Windsor, CT (US)

( * ) Notice: Subject to any disclaimer, the term of this patent is extended or adjusted under 35 U.S.C. 154(b) by 144 days.

(21) Appl. No.: 11/480,123

(22) Filed: Jun. 30, 2006

(65) Prior Publication Data

US 2006/0246326 A1    Nov. 2, 2006

Related U.S. Application Data

(63) Continuation of application No. 10/746,307, filed on Dec. 26, 2003, now abandoned.

(51) Int. Cl.
  *H01M 8/10* (2006.01)
  *H01M 8/04* (2006.01)
  *H01M 8/12* (2006.01)
  *H01M 2/14* (2006.01)
(52) U.S. Cl. .............................. 429/32; 429/23; 429/38
(58) Field of Classification Search .................... 429/13, 429/22, 23, 32, 38
See application file for complete search history.

(56) References Cited

U.S. PATENT DOCUMENTS 5,518,828 A * 5/1996 Senetar ..................... 429/26
6,251,534 B1    6/2001 McElroy

FOREIGN PATENT DOCUMENTS

JP    10-223248    8/1998
JP    63-200470    8/1998

* cited by examiner

*Primary Examiner*—Patrick Ryan
*Assistant Examiner*—Julian Mercado
(74) *Attorney, Agent, or Firm*—M. P. Williams

(57) ABSTRACT

A cascaded fuel cell stack (9a) includes a plurality of groups (10-12) of fuel cells (13) connected electrically in series by means of conductive separator plates (58, 59) and current collecting pressure plates (56, 57). Each group has an inlet fuel distributing fuel inlet manifold (17a, 19c, 20c), a fuel exit manifold (19a, 20a) of each group except the last feeding the inlet manifold of each subsequent group. A microcontroller responds to signals from a plurality of voltage sensing devices (48a-48c) to cause corresponding switches (50a-50c) (a) to connect each group, and all preceding groups in the sequence, to a voltage limiting device (VLD) (45), or (b) to connect each group to its own (VLD (45a-45c), in response to sensing a predetermined average cell voltage across the corresponding group. When normal operation occurs, the microcontroller connects the main load and disconnects the voltage limiting device (53) (25).

20 Claims, 3 Drawing Sheets

FIG.3
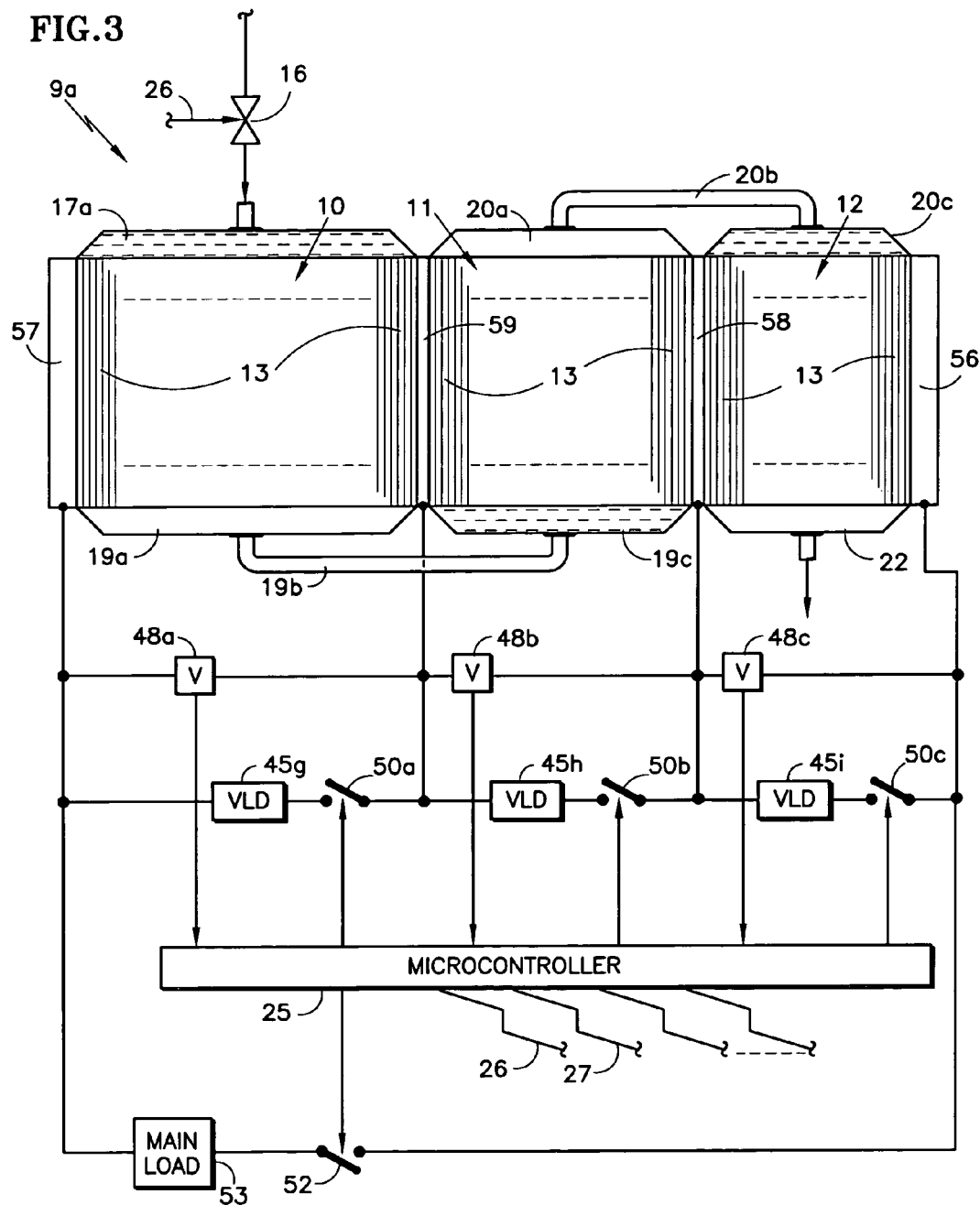
FIG.4
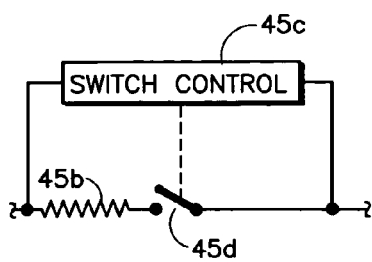
FIG.5
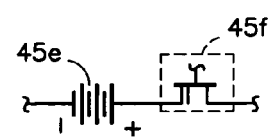
FIG.6

START UP OF CASCADED FUEL CELL STACK

CROSS REFERENCE TO RELATED APPLICATIONS

This application is a continuation of U.S. patent application Ser. No. 10/746,307 filed Dec. 26, 2003 now abondoned.

TECHNICAL FIELD

This invention relates to cascaded control of fuel flow and voltage of cascaded fuel cell stacks, such as during startup and shutdown.

BACKGROUND ART

To achieve very high fuel utilizations, about 98% or 99%, when operating a fuel cell stack 9 on pure hydrogen, a cascade fuel flow field, illustrated in FIG. 1, comprises a plurality of groups 10-12 of fuel cells 13 arranged in flow-series relationship so that fuel from a source (not shown) passing through a fuel inlet valve 16 enters a fuel inlet manifold 17, flows through a first group 10 of fuel cells 13, then enters a first turn-around manifold 19, then flows through the second group 11 of fuel cells 13, thence through a second turn-around manifold 20 and through the third group 12 of fuel cells 13, to an exit manifold 22.

For a typical 40 kilowatt fuel cell stack, the first group 10 has a large number of cells 13, which may be on the order of about 200 cells, the second group 11 has a lesser number of cells 13, which may be on the order of about 70 cells, and the third group 12 may have on the order of about 25 cells. As is known, this assures that all of the cells get adequate hydrogen even with high hydrogen utilization, provided that the last group of cells 12 get adequate hydrogen.

Referring to FIG. 1, during the production of electricity in normal fuel cell operation mode, a microcontroller 25 provides a signal on a line 26 to cause a fuel inlet valve 16 to be open, to provide fuel to the inlet manifold 17. The processor 25 also provides a signal on a line 27 to cause a normal fuel outlet valve 23 to be open. Under this condition, the fuel enters the inlet manifold 17, passes through the group 10 of cells 13, into the first turn-around manifold 19, through the group 11 of cells 13, through the second turn-around manifold 20, through the group 12 of cells 13, through the exit manifold 22, through the outlet valve 23, and to the exhaust 30.

The fuel cell stack may include a recycle loop 38 driven by a pump 39, all in a conventional fashion; however, the use of a recycle loop is optional.

In U.S. Pat. No. 6,887,599, it is shown that the more rapidly the fresh hydrogen-containing fuel flows through the anode flow field upon start-up, to displace the air therein, the quicker the hydrogen/air interface moves through the anode flow field, and the less time there is for the occurrence of corrosion of the platinum catalyst and catalyst support.

In U.S. Pat. No. 6,821,668, a cascade reactant flow field of a fuel cell stack has additional fuel inlet valves to provide inlet fuel directly to each cascade of the stack and at least one additional exhaust valve to remove fuel directly from each cascade of the stack. This may be used for rapid deployment of fuel into the fuel flow field during start-up.

Although rapid purging reduces startup problems referred to hereinbefore, performance decay of cascaded fuel cell stacks is still unacceptable.

It is also known in the art, as illustrated in the aforementioned U.S. Pat. No. 6,887,599, to connect a voltage limiting device 45 across the main electrical output terminals 46, 47 as soon as a predetermined cell voltage, such as about 0.2 volts per cell is detected by a voltage sensing device 48, which causes the microcontroller 25 to close a switch 50. The voltage limiting device, in the aforementioned application, is simply an auxiliary load resistor.

When it is determined, either by the passage of time or by sensing parameters of the fuel cell stack, that normal operation can be achieved, the micro controller 25 will close a switch 52 to connect the main load 53 across the fuel cell electrical output terminals 46, 47, and open the switch 50.

If the voltage limiting device is not connected across the stack while the groups of cells 10 are being fed hydrogen, then these cells will have excessive voltage, and resulting carbon corrosion and ultimate performance decay. On the other hand, if the voltage limiting device 45 is connected across the stack prior to hydrogen reaching the second and third groups 11, 12 of cells, the anodes in the cells in the second and third groups are driven to an elevated potential that results in corrosion of the carbonaceous catalyst support and other components of the cells.

The foregoing problems have resulted in the conclusion that fuel cell stacks with cascade fuel feed are impractical, due to the certainty of early performance decay.

DISCLOSURE OF INVENTION

Objects of the invention include: a fuel cell stack having the high-fuel-utilization advantage of a cascade fuel flow field without the startup problems, such as reverse cell voltage, carbon corrosion and performance decay, heretofore associated therewith; and an improved fuel cell stack utilizing cascade flow fields which has no unusual degradation of catalysts and other parts as a consequence of frequent shut-down and start-ups.

This invention is predicated in part on our discovery that fuel distribution in the diverse groups of fuel cells within a cascaded fuel cell stack is operationally ineffective, and in part on the fact that voltage control during startup and shutdown of a fuel cell stack must be accomplished in conjunction with each group of fuel cells receiving fuel.

According to the present invention, a cascade of groups of fuel cells arranged in serial fuel flow arrangement includes an inlet fuel distributing fuel inlet manifold for each group of the series, thereby providing operationally adequate fuel distribution in each group of fuel cells. According further to the invention, voltage control during startup of a fuel cell stack in a serial fuel flow, cascaded fuel cell stack, is accomplished one group of fuel cells at a time, thereby responding directly to the introduction of fuel to each group.

The invention allows startup of each group of a cascaded group of fuel cells in a stack to be started up, one group at a time, each group having advantageous startup conditions as would be the case of individual, non-cascaded fuel cell stacks known to the prior art.

Other objects, features and advantages of the present invention will become more apparent in the light of the following detailed description of exemplary embodiments thereof, as illustrated in the accompanying drawing.

BRIEF DESCRIPTION OF THE DRAWINGS

FIGS. 3-6 are partial, simplified schematic diagrams of various voltage limiting devices.

MODE(S) FOR CARRYING OUT THE INVENTION

Figure 2:
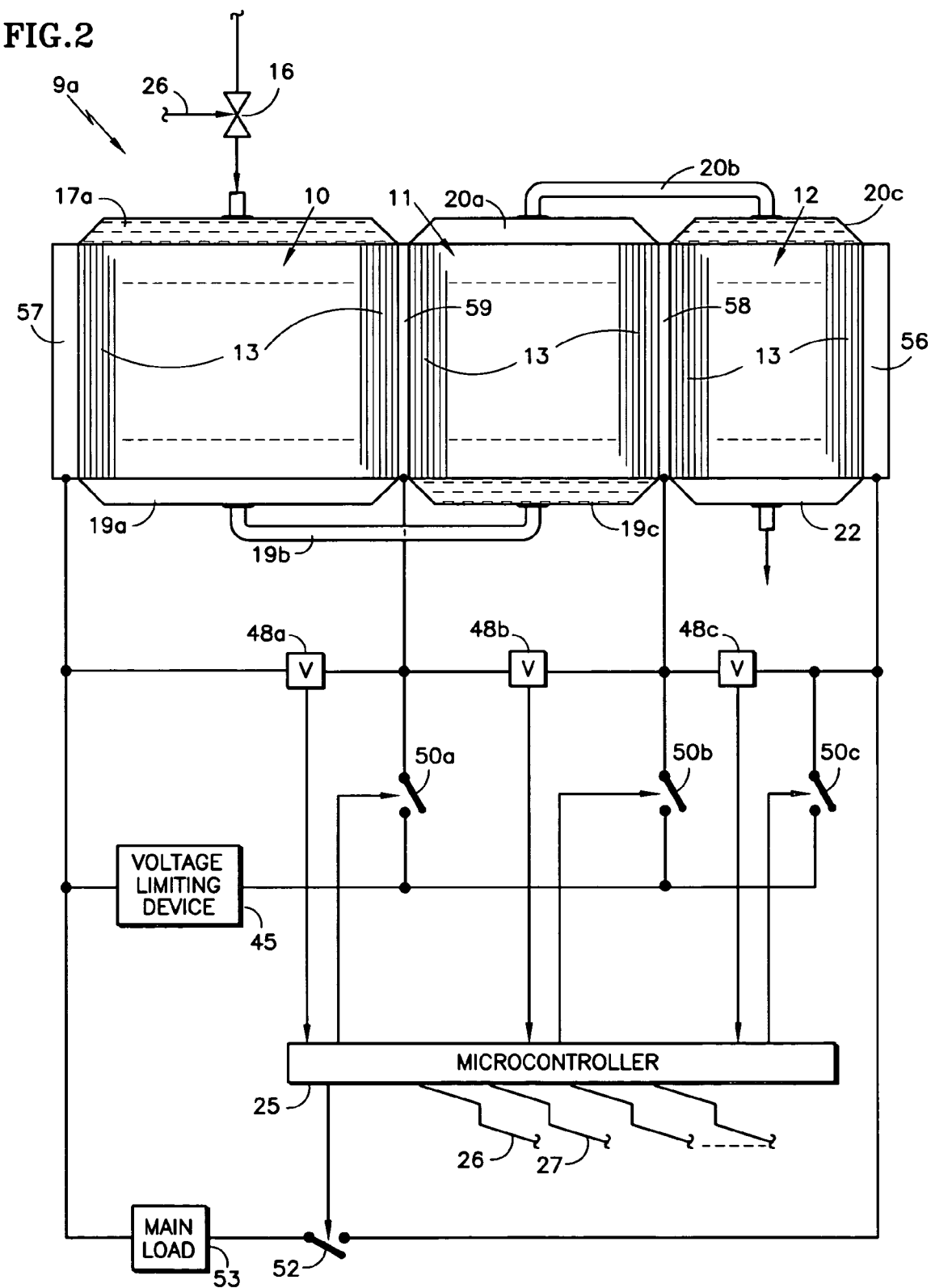
FIG. 2 is a schematic diagram of an exemplary three-group cascade fuel cell stack, in accordance with the invention.

Referring to FIG. 2, a cascaded fuel cell stack 9a according to the invention includes an inlet fuel distributing fuel inlet manifold 17a at the inlet to the fuel flow fields of the fuel cells 13 in the first group 10. The fuel distributing manifold 17a may be a cascade fuel inlet manifold as described in U.S. Pat. No. 6,924,056. The device disclosed therein divides the fuel in half a number of times, such as four times, so that it is evenly distributed across the entire stack of fuel cells, whereby each fuel cell fuel flow field receives a uniform amount of fuel, simultaneously with the fuel flow fields of the other fuel cells. The fuel distributing manifold 17a may also take the form of a permeable baffle inlet fuel gas distributor, as disclosed in U.S. Patent application Pub. No. 2005/0129999, in which fuel is evenly distributed by being forced through a permeable baffle, which may be porous, have orifices, be in the form of screening, mesh or other materials. Or, other inlet fuel distributing, composite fuel inlet manifolds may be used.

Figure 1:
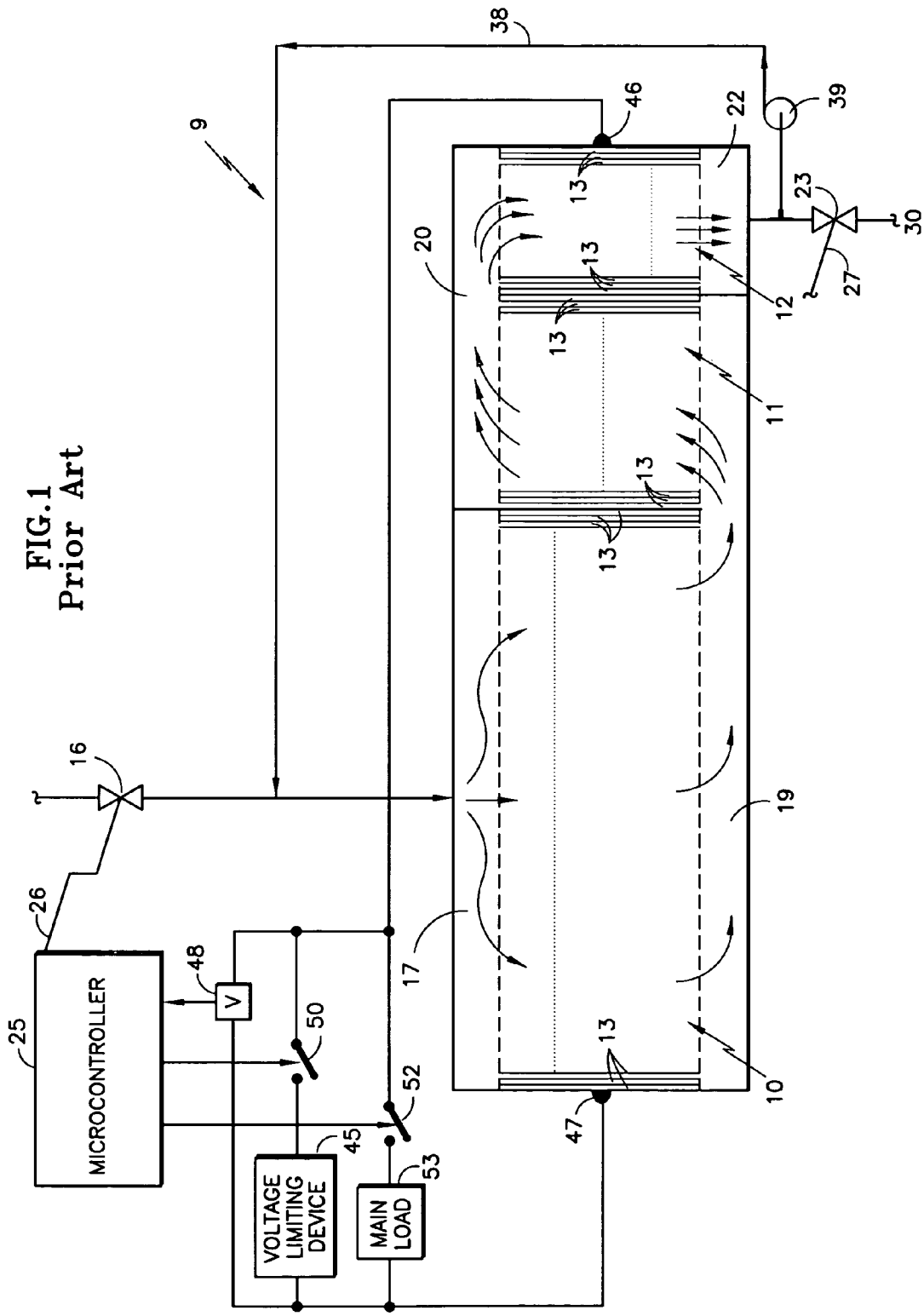
FIG. 1 is a schematic diagram of a three-group cascade fuel cell stack known to the prior art.

The fuel passing through the fuel flow fields of the first group 10 of fuel cells 13 will reach a fuel exit manifold 19a, which is not itself in direct communication with the fuel cells 13 of the group 11. Instead, the fuel exit manifold 19a feeds a fuel conduit 19b which in turn feeds another fuel distributing fuel inlet manifold 19c. Although the manifolds 17a, 20a, and 20c and fuel conduit 20b are shown as separate elements, they may be integrated into a single structure; similarly, the manifolds 19a, 19c, and 22 may be integrated into a single structure along with fuel conduit 19b. This manifold, similar to the manifold 17a, will distribute the fuel evenly throughout the group 11 of fuel cells 13. This is in contrast to the manner in which fuel is distributed, in the prior art shown in FIG. 1, in which there is an inherent tendency for the fuel cells 13 of the group 11 which are closest to the group 10 to receive the fuel first, and to receive more fuel than those fuel cells 13 which are disposed closer to the group 12. This is an important aspect of the present invention.

Instead of a plain turnaround manifold between the group 11 and the group 12, the group 11 has a fuel exit manifold 20a which feeds a fuel conduit 20b which carries the fuel to another fuel distributing fuel inlet manifold 20c, similar to the other manifolds 17a, 19c. This in turn causes a uniform, simultaneous flow of fuel entering the fuel flow fields of the fuel cells 13 in the group 12. This is in contrast to the tendency, shown in the prior art of FIG. 1, for the fuel to enter those fuel cells 13 of the group 12 which are closer to the group 11, causing less fuel and a delay in a fuel arrival for the fuel cells 13 which are farther away from the group 11. The group 12 of fuel cells 13 all communicate with a fuel exit manifold 22, which in turn may feed the fuel recycle apparatus 38, 39 illustrated in FIG. 1, if desired.

Thus, a first aspect of the present invention includes distributing the fuel evenly to each group in turn so that all of the fuel cells in a given group receive a uniform amount of fuel simultaneously with the other fuel cells of that same group.

A second aspect of the present invention includes substack voltage monitors 48a-48c which in turn cause the microcontroller 25 to operate separate voltage limiting device (VLD) switches 50a-50c. The substack voltage monitors 48a-48c are connected either to two conductive separator plates 58, 59 or to one end plate 56, 57 and one separator plate 58, 59.

When the fuel cell is started up, the microcontroller will open the valve 16 by means of a signal on the line 26 and hydrogen will begin to flow through the fuel distributing fuel inlet manifold 17a. The fuel will enter the fuel cells simultaneously and this will cause voltage to develop between the end plate 57 and the separator plate 59. When the sub stack voltage monitor 48a determines a suitable predetermined cell voltage, which might be on the order of 0.2 volts per cell, the microcontroller 25 will close the switch 50a connecting the voltage limiting device across the group 10 of fuel cells 13. The two other groups of fuel cells have not yet received fuel and are not yet connected to the voltage limiting device. Once fuel begins entering the group 11 of fuel cells 13, uniformly dispersed by the fuel distributing fuel inlet manifold 19c, the cell voltage will begin to build up between the separator plate 58 and the separator plate 59. When the sub stack voltage monitor 48b senses an adequate voltage, which may be on the order of 0.2 volts per cell, the microcontroller 25 will cause the switch 50b to close and the switch 50a to thereafter open, thereby connecting the group 11 in series with the group 10 across the voltage limiting device 45 through the switch 50b. Thus, voltage is limited at the appropriate time when fuel is building up in the fuel flow fields of the fuel cells 13.

Eventually fuel will reach the fuel distributing fuel inlet manifold 20c and voltage will begin to build up between the end plate 56 and the separator plate 58. When the sub stack voltage monitor 48c indicates a predetermined voltage, which might be on the order of 0.2 volts/cell, the microcontroller 25 will close the switch 50c and thereafter open the switch 50b, thereby causing all three groups 10-12 to be connected across the voltage limiting device 45 through the switch 50c. When the microcontroller determines that all three groups are operating normally, it will cause the switch 52 to close thereby connecting the main load 53 across the stack 9a by connecting it to the pressure plates 56, 57, and the microcontroller will immediately open the switch 50c.

Upon shutdown, as is known, the air to the cathode is turned off after which the microcontroller will close the switch 50c, so that the voltage limiting device 45 consumes the energy as the oxygen in the cathode oxidant channels of all three groups 10-12 is depleted. Thereafter, the microcontroller 25 will shut off the fuel by means of the valve 16; the switch 50c typically will remain closed until the next time that the fuel cell stack is to be operated.

The voltage limiting device 45 may be a simple resistive auxiliary load 45a (FIG. 4) as in the aforementioned U.S. Pat. No. 6,887,599, or it may be a resistive load 45b (FIG. 5) which is connected and disconnected, repetitively, in a pulse width modulation fashion by a control 45c and a switch 45d as disclosed in U.S. Pat. No. 7,041,405. The voltage limiting device 45 may be an energy recovery and storage apparatus as disclosed in U.S. Pat. No. 6,991,864, which includes batteries 45e (FIG. 6) and capacitors as well as buck and boost controls 45f.

FIG. 3 illustrates that instead of a single voltage limiting device 45 for the entire stack, each group may have its own voltage limiting device 45g-45i; in such case, each switch 50a-50c, once closed, will remain closed until the microcontroller closes switch 52.

Although disclosed in a three group configuration herein, the invention may be used in cascaded fuel cell stacks having only two groups, or having three, four or more groups. The voltage limiting aspects of the invention are preferably used with the inlet fuel distributing aspects of the invention, but the various aspects of the invention may be used separately.

The aforementioned patents and patent publication are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A method of operating electrically connected groups of fuel cells arranged in a serial cascaded fuel flow relationship, comprising:
   providing fuel substantially simultaneously to all of the fuel cells in a first one of said groups of fuel cells;
   electrically connecting said first group of fuel cells to voltage limiting means in response to cell voltage of said first group reaching a predetermined magnitude;
   providing fuel exhaust of said first group of fuel cells substantially simultaneously to all of the fuel cells in a second one of said groups of fuel cells; and
   electrically connecting said second group of fuel cells to voltage limiting means in response to cell voltage of said second group of fuel cells reaching said predetermined magnitude, while retaining connection of said first group of fuel cells to voltage limiting means.

2. A method of operating electrically connected groups of fuel cells arranged in serial cascaded fuel flow relationship, said groups including a first group of fuel cells which is first in said serial fuel flow, and a second group of fuel cells which is second in said serial fuel flow, said method comprising:
   (a) providing fuel to said first group;
   (b) electrically connecting voltage limiting means across said first group in response to cell voltage of said first group reaching a predetermined magnitude; and
   (c) electrically connecting voltage limiting means across said second group in response to cell voltage of said second group reaching said predetermined magnitude, while retaining connection of said first group of fuel cells to voltage limiting means.

3. A method according to claim 2 wherein:
   said voltage limiting means is selected from (a) an auxiliary resistive load and (b) an energy storage system.

4. A method according to claim 2 wherein:
   said step (b) comprises connecting said first group to a first voltage limiting device; and
   said step (c) comprises connecting said second group to a second voltage limiting device separate from said first voltage limiting device, and leaving said first group connected to said first voltage limiting device.

5. A method according to claim 2 wherein:
   said step (b) comprises connecting said first group to a first voltage limiting device; and
   said step (c) comprises connecting both said first group and said second group to said first voltage limiting device.

6. A method according to claim 2 wherein:
   said groups include a third group of fuel cells which is third in said serial fuel flow, and further comprising:
   (d) electrically connecting voltage limiting means across said first group of fuel cells, said second group of fuel cells and said third group of fuel cells in response to cell voltage of said third group of fuel cells reaching said predetermined magnitude.

7. A method according to claim 2 wherein:
   said predetermined magnitude is on the order of 0.2 volts per cell.

8. A method of operating electrically connected groups of fuel cells arranged in serial cascaded fuel flow relationship, comprising:
   (a) providing fuel simultaneously to all of the fuel cells in a first one of said groups of fuel cells; and
   (b) providing fuel exhaust of said first group of fuel cells simultaneously to all of the fuel cells in a second one of said groups of fuel cells.

9. A method according to claim 8 wherein:
   said step (a) comprises providing a substantially uniform amount of fuel simultaneously to all of the fuel cells in said first group; and
   said step (b) comprises providing a substantially uniform amount of the fuel exhaust of said first group simultaneously to all of the fuel cells in said second group.

10. A method according to claim 8 further comprising:
    (c) providing fuel exhaust of said second group of fuel cells simultaneously to all of the fuel cells in a third one of said groups of fuel cells.

11. Apparatus comprising:
    electrically connected groups of fuel cells arranged in serial cascaded fuel flow relationship;
    voltage limiting means;
    means configured to provide fuel substantially simultaneously to all of the fuel cells in a first one of said groups of fuel cells;
    means configured to electrically connect said first group of fuel cells to said voltage limiting means in response to cell voltage of said first group reaching a predetermined magnitude;
    means configured to provide fuel exhaust of said first group of fuel cells substantially simultaneously to all of the fuel cells in a second one of said groups of fuel cells; and
    means configured to electrically connect said second group of fuel cells to voltage limiting means in response to cell voltage of said second group of fuel cells reaching said predetermined magnitude, while retaining connection of said first group of fuel cells to voltage limiting means.

12. Apparatus comprising:
    electrically connected groups of fuel cells arranged in serial cascaded fuel flow relationship, said groups including a first group of fuel cells which in first in said serial fuel flow, and a second group of fuel cells which is second in said serial fuel flow, comprising:
    (a) means configured to provide fuel to said first group of fuel cells;
    (b) means configured to electrically connect voltage limiting means across said first group in response to cell voltage of said first group reaching a predetermined magnitude; and
    (c) means configured to electrically connect voltage limiting means across said second group in response to cell voltage of said second group reaching said predetermined magnitude, while retaining connection of said first group of fuel cells to voltage limiting means.

13. Apparatus according to claim 12 wherein:
    said voltage limiting means is selected from (a) an auxiliary resistive load and (b) an energy storage system.

14. Apparatus according to claim 12 wherein:
    said element (b) comprises means configured to connect said first group to a first voltage limiting device; and
    said element (c) comprises means configured to connect said second group to a second voltage limiting device separate from said first voltage limiting device, and leaving said first group connected to said first voltage limiting device.

15. Apparatus according to claim 12 wherein:
said element (b) comprises means configured to connect said first group to a first voltage limiting device; and
said element (c) comprises means configured to connect both said first group and said second group to said first voltage limiting device.

16. Apparatus according to claim 12 wherein:
said groups include a third group of fuel cells which is third in said serial fuel flow, and further comprising:
(d) means configured to electrically connect voltage limiting means across said first group of fuel cells, said second group of fuel cells and said third group of fuel cells in response to cell voltage of said third group of fuel cells reaching said predetermined magnitude.

17. Apparatus according to claim 12 wherein:
said predetermined magnitude is on the order of 0.2 volts per cell.

18. Apparatus comprising:
electrically connected groups of fuel cells arranged in serial cascaded fuel flow relationship, comprising:
(a) means configured to provide fuel simultaneously to all of the fuel cells in a first one of said groups of fuel cells; and
(b) means configured to provide fuel exhaust of said first group of fuel cells simultaneously to all of the fuel cells in a second one of said groups of fuel cells.

19. Apparatus according to claim 18 wherein:
said element (a) comprises means configured to provide a substantially uniform amount of fuel simultaneously to all of the fuel cells in said first group; and
said element (b) comprises means configured to provide a substantially uniform amount of the fuel exhaust of said first group simultaneously to all of the fuel cells in said second group.

20. Apparatus according to claim 18 further comprising:
(c) means for providing fuel exhaust of said second group of fuel cells simultaneously to all of the fuel cells in a third one of said groups of fuel cells.

* * * * *